(12) United States Patent  (10) Patent No.: US 7,409,843 B1
Rinehart, Sr.  (45) Date of Patent: Aug. 12, 2008

(54) WATER SPIGOT LOCKING APPARATUS

(76) Inventor: James M. Rinehart, Sr., 614 Chestnut St., York, PA (US) 17403

( * ) Notice: Subject to any disclaimer, the term of this patent is extended or adjusted under 35 U.S.C. 154(b) by 401 days.

(21) Appl. No.: 11/144,404

(22) Filed: Jun. 6, 2005

(51) Int. Cl.
  *F16B 41/00* (2006.01)
(52) U.S. Cl. .......................................... 70/232; 70/258
(58) Field of Classification Search ................... 70/232, 70/258, 259; 411/370–376, 403, 405, 910
  See application file for complete search history.

(56) References Cited

U.S. PATENT DOCUMENTS

| | | | |
|---|---|---|---|
| 1,377,531 A | | 5/1921 | Voight |
| 1,748,422 A | * | 2/1930 | Lee .............. 70/232 |
| 1,814,343 A | | 7/1931 | Smith |
| 1,900,146 A | * | 3/1933 | Winkler ........ 70/232 |
| 1,937,848 A | * | 12/1933 | Shinn ........... 70/231 |
| 2,322,347 A | * | 6/1943 | Churchman ..... 70/232 |
| 2,990,846 A | | 7/1961 | Rives |
| 3,732,033 A | * | 5/1973 | Macchi ........ 416/244 R |
| 3,981,617 A | * | 9/1976 | Milewicz ...... 416/244 B |
| 4,161,869 A | * | 7/1979 | Dixon .......... 70/166 |
| 4,380,245 A | | 4/1983 | Hefner |
| 4,397,332 A | | 8/1983 | Sample |
| 4,516,414 A | | 5/1985 | Woolvin |
| 4,856,305 A | * | 8/1989 | Adams .......... 70/58 |
| 5,806,354 A | * | 9/1998 | Hasnik ......... 70/237 |
| 5,927,111 A | | 7/1999 | Nachbauer |
| 5,941,103 A | | 8/1999 | Stearns |

* cited by examiner

*Primary Examiner*—Suzanne D Barrett

(57) ABSTRACT

An apparatus includes a cylindrical housing for fitting about a spigot. The housing has a first bore extending along a partial length thereof and a first end. The housing further has a second bore, abutting against the first end of the first bore, which has a lesser diameter than the first bore diameter. A cylindrical sleeve includes a bore extending along a partial length thereof, a rough outer surface, has opposed ends, and has a length less than that of the housing. One end is engageable with the spigot. The sleeve is engageable within the first bore such that another end thereof abuts against the first end of the first bore. Another sleeve end includes a lip portion extending inwardly therefrom. A mechanism is included for securing the sleeve and housing to the spigot such that the spigot is rendered inoperable while the sleeve and housing are connected thereto.

4 Claims, 1 Drawing Sheet

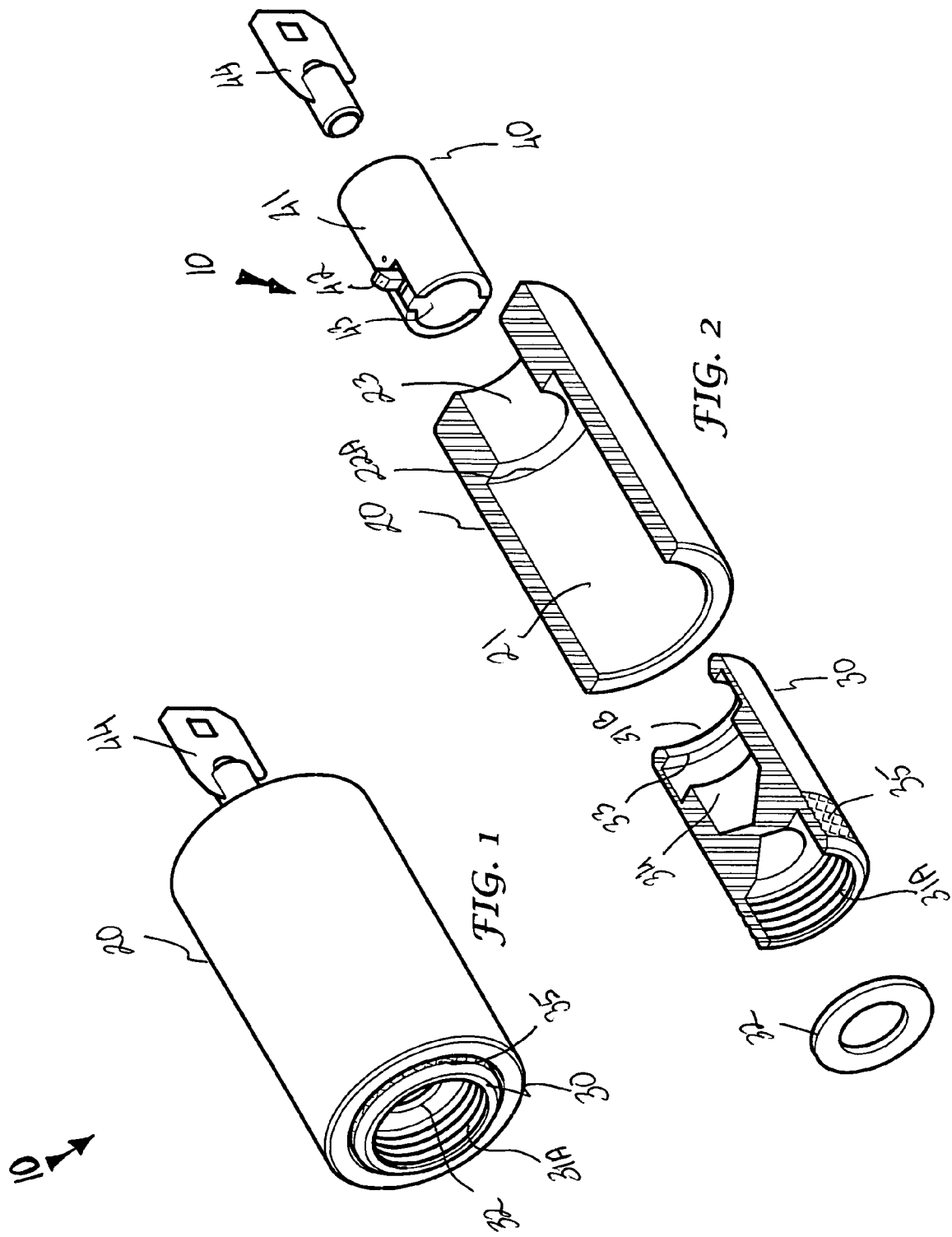

WATER SPIGOT LOCKING APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to locking apparatuses and, more particularly, to a water spigot locking apparatus for prohibiting unauthorized access to a spigot.

2. Prior Art

Water in most parts of the country is plentiful and inexpensive. There are parts of the country, though, where fresh water is in short supply simply because there are insufficient sources or because high ambient temperatures necessitate high water usage. In these areas, water necessarily must be conserved.

The cost of water can be sufficiently high to motivate someone to steal it. For instance, a neighbor or unwanted individual can very easily tap into a homeowner's water source through an outside water faucet. When the homeowner is away, it is a simple matter of connecting a garden hose to the unsuspecting homeowner's outdoor faucet and turning it on. Water diverted to the neighbor's yard for watering their grass and other purposes can be expensive. It can also be difficult to detect since any indication that there has been a wrongdoing only comes with a water bill, which can be long after the fact.

In response to this problem, the use of spigot locking means has been introduced into the prior art. Although such apparatuses and devices are effective in their respective purposes, they still have a number of drawbacks. One example shows a housing that is attached to a support surface and positioned about the spigot emerging from the support surface. Such a spigot locking device is not very aesthetically appealing and is further limited in use to spigots emerging from walls, and not to free-standing ones. It is also rather cumbersome in design and expensive to produce.

Another example shows a spigot locking apparatus that is positioned about the turn knob and the outlet port thereof. Such an example requires a separate padlock to be purchased in order to allow for the proper functioning thereof. Thus, the cost of locking one's spigot or faucet is unnecessarily increased.

Accordingly, a need remains for a water spigot locking apparatus in order to overcome the above-noted shortcomings. The present invention satisfies such a need by providing a spigot locking apparatus that is easy to use, durable in design, easily produced, useable on a variety of spigots and faucets, and effectively secures spigots and faucets from unauthorized use. The water spigot effectively increases a user's peace of mind, since they know that their water is not being used without warrant while they are away from their house.

BRIEF SUMMARY OF THE INVENTION

In view of the foregoing background, it is therefore an object of the present invention to provide a water spigot locking apparatus. These and other objects, features, and advantages of the invention are provided by a water spigot locking apparatus for prohibiting unauthorized access.

The apparatus includes a housing that has a substantially cylindrical shape and a centrally disposed longitudinal axis. Such a housing is sized and shaped for effectively fitting directly about the water spigot during locked conditions. The housing has a first axial bore extending along a partial length thereof and further has a first end portion. Such a housing further has a second axial bore abutting against the first end portion of the first bore. The second bore has a diameter less than a diameter of the first bore.

A cylindrical sleeve member has axially opposed end portions wherein one end portion is directly and threadably engageable with the water spigot. The one end portion of the sleeve member preferably includes a rubber gasket removably positioned therein for advantageously minimizing undesirable fluids from leaking out of the water spigot when an unauthorized person turns the water spigot to an on position while the locking apparatus is engaged about the water spigot.

The sleeve member is slidably engageable within the first bore such that when the sleeve member is inserted into the first bore another end portion thereof abuts against the first end portion of the first bore. Such another end portion of the sleeve member includes a monolithically formed lip portion extending inwardly therefrom wherein the lip portion is concentrically spaced inward towards the longitudinal axis. The sleeve member has a rough outer surface situated about another end portion thereof such that the user can effectively unscrew the sleeve member from the water spigot when the housing is removed from the sleeve member.

Such a sleeve member has a bore axially formed therein and extending along a partial length of the sleeve member. The bore of the sleeve member preferably has a diameter greater than a diameter of the second bore and less than a diameter of the first bore such that the sleeve member can effectively freely slide along an axial distance terminated at the second bore. The sleeve member further has a length less than a length of the housing such that the sleeve member advantageously remains completely contained within the housing.

A mechanism is included for removably securing the sleeve member and the housing to the water spigot such that the water spigot is effectively and advantageously rendered inoperable while the sleeve member and the housing are connected to the water spigot. Such a securing mechanism preferably includes a locking cylinder axially positional in the first and second bores. The locking cylinder axially and medially extends along a partial length of the first bore and is adaptable between locked and unlocked positions.

Such a locking cylinder includes a finger member disposed at a distal end thereof that is adaptable between extended and retracted positions such that the finger member orthogonally protrudes away from the locking cylinder when adapted to the locked position. A key is removably insertable into the locking cylinder. Such a key selectively adapts the locking cylinder between locked and unlocked positions. The finger member engages the lip portion when biased to the locked position in such a manner that the housing advantageously and effectively cannot be removed from the water spigot. Such a finger member is retracted when the key is rotated such that the finger member effectively disengages the lip portion and conveniently allows the user to telescopically remove the sleeve member from the housing. The housing and the locking cylinder may be formed from stainless steel. Such a locking cylinder is directly and permanently welded to the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view showing a water spigot locking apparatus, in accordance with the present invention; and FIG. 2 is an exploded cross-sectional view of the apparatus shown in FIG. 1.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-2 by the reference numeral 10 and is intended to provide a water spigot locking apparatus. It should be understood that the apparatus 10 may be used to protect many different types of spigots and faucets and should not be limited in use to only those found at private residencies.

Referring initially to FIG. 1, the apparatus 10 includes a housing 20 that has a substantially cylindrical shape and a centrally disposed longitudinal axis. Such a housing 20 is sized and shaped for effectively fitting directly, with no intervening elements, about the sleeve member 30 (described herein below) during locked conditions. The housing 20 has a first axial bore 21 extending along a partial length thereof and has a first end portion 22A. Such a housing 20 further has a second axial bore 23 abutting against the first end portion 22A of the first bore 21. The second bore 23 has a diameter less than a diameter of the first bore 21, which is essential for limiting a horizontal displacement of the sleeve member 30 (described herein below).

Referring to FIGS. 1 and 2, a cylindrical sleeve member 30 has axially opposed end portions 31 wherein one end portion 31A is directly and threadably engageable, with no intervening elements, with the water spigot. This feature is essential and advantageous for allowing the apparatus 10 to be used on a variety of wall-mounted or free-standing spigots and faucets. The one end portion 31A of the sleeve member 30 includes a rubber gasket 32 removably positioned therein that is critical and advantageous for minimizing undesirable fluids from leaking out of the water spigot when an unauthorized person turns the water spigot to an on position while the locking apparatus 10 is engaged about the water spigot.

The sleeve member 30 is slidably engageable within the first bore 21 such that when the sleeve member 30 is inserted into the first bore 21 another end portion 31B thereof abuts against the first end portion 22A of the first bore 21. Such another end portion 31B of the sleeve member 30 includes a monolithically formed lip portion 33 extending inwardly therefrom wherein the lip portion 33 is concentrically spaced inward towards the longitudinal axis. The concentrically spaced lip portion 33 is vital for providing a complete circumferential barrier to the finger member 42 (described herein below) of the locking mechanism 40 (described herein below) in the event that an unauthorized person attempts to pull the housing 20 from the sleeve 30 while the apparatus 10 is locked. The sleeve member 30 has a length less than a length of the housing 20 such that the sleeve member 30 effectively and conveniently remains completely contained within the housing 20. This is an important and advantageous feature that prohibits an unauthorized person from tampering with the sleeve 30 during operating conditions.

Referring to FIG. 2, such a sleeve member 30 has a bore 34 axially formed therein and extending along a partial length of the sleeve member 30. The bore 34 of the sleeve member 30 has a diameter greater than a diameter of the second bore 23 and less than a diameter of the first bore 21, which is vital such that the sleeve member 30 can effectively and freely slide along an axial distance terminated at the second bore 23. The sleeve member 30 further has a rough outer surface 35 situated about one end portion 31A thereof that is crucial and convenient such that the user can effectively unscrew the sleeve member 30 from the water spigot when the housing 20 is removed therefrom. Of course, the housing 20 and the sleeve member 30 may be produced in a variety of different shapes, sizes and diameters so as to effectively be employed on alternately sized and shaped spigots, as is obvious to a person of ordinary skill in the art.

Still referring to FIG. 2, a mechanism 40 is included for removably securing the sleeve member 30 and the housing 20 to the water spigot such that the water spigot is effectively and advantageously rendered inoperable while the sleeve member 30 and the housing 20 are connected to the water spigot. Such a securing mechanism 40 includes a locking cylinder 41 axially positional in the first 21 and second 23 bores. The locking cylinder 41 axially and medially extends along a partial length of the first bore 21 and is adaptable between locked and unlocked positions.

Again referring to FIG. 2, such a locking cylinder 41 includes a finger member 42 disposed at a distal end 43 thereof that is adaptable between extended and retracted positions such that the finger member 42 orthogonally protrudes away from the locking cylinder 41 when adapted to the locked position. A key 44 is removably insertable into the locking cylinder 41. Such a key 44 selectively adapts the locking cylinder 41 between locked and unlocked positions, thus advantageously granting only the bearer thereof access to the water spigot.

The finger member 42 engages the lip portion 33 when biased to the locked position in such a manner that the housing 20 advantageously and effectively cannot be removed from the water spigot. The lip portion 33 and the finger member 42, furthermore, effectively cause the housing 20 to indefinitely rotate about the sleeve member 30 when the finger member 42 is extended to a locked position. This feature is critical and advantageous for preventing a person from threadably removing the apparatus 10 from the water spigot. Such a finger member 42 is retracted when the key 44 is rotated such that the finger member 42 effectively disengages the lip portion 33 and conveniently allows the user to telescopically remove the sleeve member 30 from the housing 20. The housing 20 and the locking cylinder 41 are formed from stainless steel for ensuring the longevity and structural rigidity thereof. Such a locking cylinder 41 is directly and permanently welded, with no intervening elements, to the housing 20.

In use, a person quickly and easily attaches the sleeve member 30 to a water spigot by threadably engaging one end portion 31A thereof to the water spigot. Next, the housing 20, including the permanently welded locking cylinder 41, is slidably positioned about the sleeve 30. One is then simply required to lock the locking mechanism 40 with the key 44, and thus, no unauthorized person can gain access to the water spigot without causing obvious and incriminating damage thereto.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A water spigot locking apparatus for prohibiting unauthorized access, said apparatus comprising:

a housing having a substantially cylindrical shape and a centrally disposed longitudinal axis, said housing being sized and shaped for fitting directly about a sleeve member during locking conditions, said housing having a first axial bore extending along a partial length thereof and further having a first end portion, said housing further having a second axial bore abutting against said first end portion of the first bore, the bore having a diameter less than a diameter of the first bore;

a cylindrical sleeve member having axially opposed end portions, one said end portion being directly and threadably engageable with the water spigot, said sleeve member being slidably engageable within the first bore such that when said sleeve member is inserted into the first bore, another of said end portions thereof abuts against said first end portions of the first bore, said another end portions of said sleeve member including a monolithically formed lip portion extending inwardly therefrom wherein said lip portion is concentrically spaced inward towards the longitudinal axis, said sleeve member having a rough outer surface situated about said another end portion thereof such that the user can effectively unscrew said sleeve member from the water spigot when said housing is removed from said sleeve member, said sleeve member having a bore axially formed therein and extending along a partial length of said sleeve member, said sleeve member further having a length less than a length of said housing such that said sleeve member remains completely contained within said housing; and means for removably securing said sleeve member and said housing to the water spigot such that the water spigot is rendered inoperable while said sleeve member and said housing are connected to the water spigot.

2. The locking apparatus of claim 1, wherein said securing means comprises:

a locking cylinder axially positional in the first and second bores, said locking cylinder axially positional in the first and second bores, said locking cylinder axially and medially extending along a partial length of the first bore, said locking cylinder being adaptable between locked and unlocked positions, said locking cylinder including a finger member disposed at a distal end hereof and being adaptable between extended and retracted positions, such that said finger member orthogonally protrudes away from said locking cylinder when adapted to the locked position;

a key removably insertable into said locking cylinder, said key selectively adapting said locking cylinder between locked and unlocked positions;

wherein said finger member engages said lip portion when biased to the locked position in such a manner that said housing cannot be removed from the water spigot, said finger member being retracted when said key is rotated such that said finger member disengages aid lip portion and allows the user to telescopically removed said sleeve member from said housing.

3. The locking apparatus of claim 2, wherein said housing and said locking cylinder are formed from stainless steel, said locking cylinder being directly and permanently welded to said housing.

4. The locking apparatus of claim 1, wherein one said end of portion of said sleeve member includes a rubber gasket removable positioned therein for minimizing undesirable fluids from leaking out of the water spigot when an unauthorized person turns the water spigot to an on position while said locking apparatus is engaged about the water spigot.

* * * * *